US006172885B1

United States Patent
Feldtkeller

(10) Patent No.: US 6,172,885 B1
(45) Date of Patent: Jan. 9, 2001

(54) SWITCHED-MODE POWER SUPPLY WITH MAINS CURRENT CONSUMPTION REGULATION

(75) Inventor: Martin Feldtkeller, München (DE)

(73) Assignee: Infineon Technologies AG, Munich (DE)

(*) Notice: Under 35 U.S.C. 154(b), the term of this patent shall be extended for 0 days.

(21) Appl. No.: 09/412,057

(22) Filed: Oct. 4, 1999

Related U.S. Application Data

(63) Continuation of application No. PCT/DE98/00924, filed on Apr. 1, 1998.
(51) Int. Cl.[7] .......................... H02M 3/335; G05F 1/10
(52) U.S. Cl. ........................ 363/21; 363/98; 323/222
(58) Field of Search ......................... 363/37, 21, 97, 363/95, 98, 89, 126, 81; 323/222, 282, 285, 283, 275

(56) References Cited

U.S. PATENT DOCUMENTS

| | | | |
|---|---|---|---|
| 5,515,257 | * 5/1996 | Ishii | ........................................ 363/21 |
| 5,594,323 | * 1/1997 | Herfurth et al. | ....................... 323/222 |
| 5,617,306 | 4/1997 | Lai et al. | . |
| 5,867,379 | * 2/1999 | Maksimovic et al. | .................. 363/89 |

FOREIGN PATENT DOCUMENTS 0 308 642 A1   3/1989   (EP).
0 664 602 A1   7/1995   (EP).

* cited by examiner

*Primary Examiner*—Peter S. Wong
*Assistant Examiner*—Rajnikant B. Patel
(74) *Attorney, Agent, or Firm*—Herbert L. Lerner; Laurence A. Greenberg; Werner H. Stemer

(57) ABSTRACT

A switched-mode power supply has a power regulating configuration for regulating mains current consumption, a rectifier configuration which is connected to the power regulating configuration and has output terminals at which a bus voltage is available, and a switched-mode regulator is connected to the output terminals of the rectifier configuration and an output voltage $V_{OUT}$ can be tapped off at its output terminal. Both the bus voltage and the output voltage are fed back via feedback paths to the power regulating configuration.

14 Claims, 3 Drawing Sheets

SWITCHED-MODE POWER SUPPLY WITH MAINS CURRENT CONSUMPTION REGULATION

CROSS-REFERENCE TO RELATED APPLICATION

This application is a continuation of copending International Application PCT/DE98/00924, filed Apr. 1, 1998, which designated the United States.

BACKGROUND OF THE INVENTION

Field of the Invention

The present invention relates to a switched-mode power supply with mains current consumption regulation which, inter alia, has the following features:

(a) at least one power factor controller, including:
  (a1) a power regulating configuration for regulating the mains current consumption, and a rectifier configuration;
  (a2) two input connections at which a mains voltage can be input into the switched-mode power supply; and
  (a3) two output terminals at which a bus voltage can be tapped off;
(b) a switched-mode regulator which is connected to the output terminals of the rectifier configuration and at whose output terminals an output voltage can be tapped off; and
(c) a load which is connected downstream of the switched-mode regulator and is disposed between its output terminals.

SUMMARY OF THE INVENTION

It is accordingly an object of the invention to provide a switched-mode power supply with mains current consumption regulation which overcomes the above-mentioned disadvantages of the prior art devices of this general type.

With the foregoing and other objects in view there is provided, in accordance with the invention, a switched-mode power supply, including:

at least one power factor controller having a power regulating configuration for regulating a sinusoidal mains current consumption, a rectifier configuration connected to the power regulating configuration, two input connections at which a mains voltage can be input into the at least one power factor controller, and two output terminals at which a bus voltage can be tapped off and being concurrently output terminals of the rectifier configuration;
a switched-mode regulator connected to the output terminals of the rectifier configuration and having regulator output terminals at which an output voltage can be tapped off;
a load connected downstream of the switched-mode regulator and disposed between the regulator output terminals;
a first measurement configuration having an output outputting a first regulating signal dependent on the bus voltage;
a feed forward control having a first feedback path with an integrator configuration for feeding back the first regulating signal to the power regulating configuration;
a second feedback path having an output; and
a second measurement configuration connected to the regulator output terminals and if a power consumption of the load changes, the second measurement configuration produces a second regulating signal which can be input into the power regulating configuration via the second feedback path.

The object of such known switched-mode power supplies is to provide a DC voltage that is as constant as possible at the output terminals of the switched-mode regulator, with a mains power consumption which is as sinusoidal as possible. The requirement for such switched-mode power supplies to have a sinusoidal mains current consumption results from the European Commission Order according to which power supplies, for example computers, with a power consumption of more than 75 W, must ensure a mains current consumption which is as sinusoidal as possible.

The object of the power regulating configuration is, on the one hand, to produce a sinusoidal mains power consumption at its output terminals and, on the other hand, to regulate the power emitted to the rectifier configuration via the output terminals of the power regulating configuration such that a bus voltage which is as constant as possible, even when the load on the output terminals of the switched-mode regulator fluctuates, at the output terminals of the rectifier configuration. The switched-mode regulator connected downstream of the rectifier configuration uses the bus voltage to produce an output voltage, which is transformed down, is isolated from the mains and is resistant to short circuits, for loads connected to its output terminals. The object of the first measurement configuration is to provide a first bus voltage signal which is dependent on the bus voltage and is fed back via a first feedback path to the power regulating configuration, in order to regulate the emitted power as a function of the bus voltage. The first feedback path in such switched-mode power supplies normally includes an integrator having a long time constant, in order to eliminate the influences of unavoidable residual ripple of the bus voltage on the regulation of the power emitted from the power regulating configuration.

The disadvantage of such switched-mode power supplies is that the bus voltage rises sharply when the load on the output terminals of the switched-mode regulator falls, before the power regulating configuration (governed by the integration of the bus voltage signal which is dependent on the bus voltage) regulates the emitted power down. Such switched-mode power supplies therefore require overvoltage disconnection, which switches off the power regulating configuration when the bus voltage exceeds a nominal value by a predetermined amount, in order to protect those components connected to the output terminals of the rectifier configuration from being destroyed. Therefore, in some circumstances, the power regulating configuration is switched off for several seconds, which is disadvantageous particularly when the power regulating configuration is supplying an integrated circuit which, for example, includes the control logic for the power regulating configuration or the switched-mode regulator.

U.S. Pat. No. 5,515,257 discloses an AC/DC converter which has a power factor controller with a power regulating configuration for regulating the mains current consumption, a rectifier device as well as a switched-mode regulator. The switched-mode regulator is connected to the rectifier configuration. Furthermore, a load across which an output voltage can be tapped off can be connected to its output terminals. The output voltage is tapped off from a measurement configuration and is supplied to a pulse-width modulator that produces a regulating signal and controls the switched-mode regulator. Furthermore, the regulating signal is supplied, after weighting in a frequency divider, to the power factor controller in order to keep the voltage supplied to the switched-mode regulator approximately constant. In consequence, the AC/DC converter can be operated over a wide input voltage range.

The object of the present invention is thus to provide a switched-mode power supply having a sinusoidal mains current consumption and a DC voltage which is as independent as possible of the load across the output terminals of the switched-mode regulator, in which the power regulating configuration reacts virtually without any delay to load changes at the output of the switched-mode regulator.

In addition to a first bus voltage signal which is dependent on the bus voltage and is fed back, after integration, to the power regulating configuration, a second regulating signal, which is dependent on the output voltage, is also fed back in the switched-mode power supply according to the invention via a second feedback path to the power regulating configuration, with no integrator being required in the second feedback path. The power regulating configuration can thus react virtually without any time delay to load changes at the output terminals of the switched-mode regulator, by varying the power emitted to the rectifier configuration.

The power regulating configuration advantageously has a power switch that is disposed in parallel with the output terminals of the power regulating configuration and is controlled by drive pulses. An open switch results in that current flows from the power regulating configuration to the rectifier configuration, while a closed power switch short-circuits the output of the power regulating configuration, as a result of which no current flows in the direction of the rectifier configuration and, in consequence, no power is emitted to it. The power emitted to the rectifier configuration can thus be regulated, inter alia, as a function of the duration of the drive pulses.

A further embodiment provides for the power regulating configuration to have a subtraction configuration and a pulse-width modulator, in which case the drive pulses are present at one output of the pulse-width modulator, and an output of the subtraction configuration is connected to an input of the pulse-width modulator. In this case, an internally produced current signal is applied to a first input of the subtraction configuration, and a control signal is applied to a second input. The current signal depends on the current actually flowing in the power regulating configuration. Depending on the embodiment of the invention, the control signal is either always an internally produced reference signal (which is weighted by a second bus voltage signal which is present at an output of the first feedback path and by a second output signal which is present at the output of the second feedback path), or the control signal is either the reference signal weighted in the described manner or the first bus voltage signal, depending on the first or second output signal.

One embodiment of the invention thus provides for the power regulating configuration to have a multiplier configuration with three inputs, to which the internally produced reference signal, the second output signal which is present at the output of the second feedback path, and the second bus voltage signal which is present at the output of the first feedback path are applied. In this embodiment, one output of the multiplier configuration is connected directly to the second input of the subtraction configuration. The reference signal, which is weighted by multiplication by the second output signal and the second bus voltage signal, reproduces the signal form of the desired mains power consumption, in most cases a sine function or a full-wave-rectified sine function. The signal applied to the input of the pulse-width modulator is the difference between the weighted reference signal and the current signal, and the power switch is thus driven as a function of the error between the actual current consumption and the desired current consumption of the power regulating configuration.

A further embodiment provides for the power regulating configuration to have a changeover switch in addition to the multiplier configuration. In which case one output terminal of the changeover switch is connected to the second input of the subtraction configuration, a first input terminal of the changeover switch is connected to the output of the multiplier configuration, and a second input terminal of the changeover switch is connected to the output of the first measurement configuration. The changeover switch preferably switches over as a function of the first or second output signal. The changeover switch is switched over in such a manner that, when the power levels emitted to the load are low and that switched-mode supply power consumption which is less than the power limit value above which a sinusoidal mains current consumption is required, the control signal is formed directly by the second bus voltage signal while, at higher power consumption levels, at which a sinusoidal mains current consumption is required, the control signal is formed by the weighted reference signal.

In an embodiment without a changeover switch, in order to prevent the control signal from becoming zero, the second feedback path has a device for addition of an offset signal to the first output signal.

The pulse-width modulator, the multiplier configuration, the subtraction configuration of the power regulating configuration, a control circuit of the switched-mode regulator and the second feedback path are preferably integrated monolithically in a semiconductor circuit. The first output signal supplied from the second measurement configuration is used both in the control circuit of the switched-mode regulator in order to produce control signals for a second power switch included in the switched-mode regulator, and are fed back via the second feedback path in order to produce drive pulses for the power switch in the power regulating configuration. Monolithic integration of the elements in a semiconductor circuit avoids, in particular, interface problems and synchronization problems, which occur when the elements are integrated in different semiconductor circuits.

The power regulating configuration preferably has a bridge rectifier in parallel with the connecting terminals of the power regulating configuration, with an inductance being connected in series with the output terminals of the bridge rectifier.

The rectifier configuration preferably has a diode connected in series with its input and a capacitor connected in parallel with its output terminals. The rectifier configuration configured in this way is simple to produce and is effective in operation.

In order to provide the current signal, the power regulating configuration has a first current sensing resistor, at whose terminals a voltage which is proportional to the current flowing in the power regulating configuration, can be tapped off. The first current sensing resistor is preferably connected in series with the inductance. Furthermore, the current regulating configuration has a second current sensing resistor, one terminal of which is connected to one of the output terminals of the bridge rectifier, in order to provide the reference signal.

The first measurement configuration for providing the first bus voltage signal preferably has a voltage divider which is connected in parallel with the output terminals of the rectifier configuration and across which it is possible to tap off a voltage on which the first bus voltage signal depends.

A second inductance is preferably connected in the power regulating configuration such that it complements the inductance to form a transformer, with a second rectifier configuration being connected downstream of the second inductance. The second rectifier configuration is used to supply voltage to the control logic associated with the power regulating configuration and the switched-mode regulator.

Other features which are considered as characteristic for the invention are set forth in the appended claims.

Although the invention is illustrated and described herein as embodied in a switched-mode power supply with mains current consumption regulation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
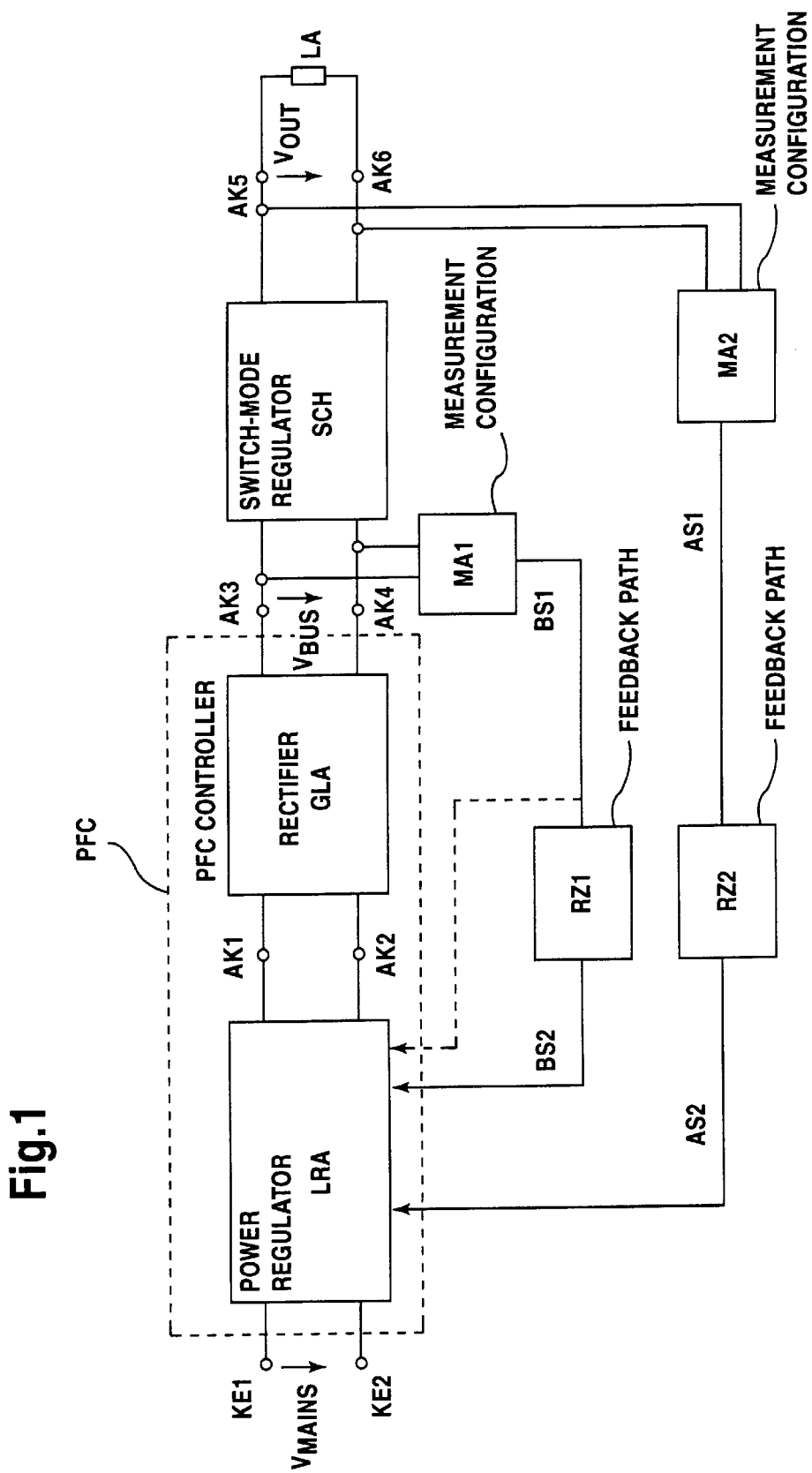
FIG. 1 is a diagrammatic, block diagram of a switched-mode power supply according to the invention.

Unless stated to the contrary, in all the figures of the drawing, sub-features and integral parts that correspond to one another bear the same reference symbol in each case. Referring now to the figures of the drawing in detail and first, particularly, to FIG. 1 thereof, there is shown a block diagram of a switched-mode power supply according to the invention. The illustration shows a power regulating configuration LRA having a first and a second connecting terminal KE1, KE2, between which a mains voltage VMAINS is applied, and a first and a second output terminal AK1, AK2. A rectifier configuration GLA is connected to the output terminals AK1, AK2 of the power regulating configuration LRA and has a first and a second output terminal AK3, AK4, between which a bus voltage $V_{BUS}$ is present. The power regulating configuration LRA and the rectifier-configuration GLA together form a power factor correction (PFC) controller PFC, which is used for power factor improvement. Downstream from the rectifier configuration GLA there is a switched-mode regulator SCH having a first and a second output terminal AKS, AK6, between which an output voltage VOUT can be tapped off and between which a load LA is disposed.

A first measurement configuration MA1, having input terminals between which the bus voltage $V_{BUS}$ is applied, supplies at its output a first regulating signal BS1 which is dependent on the bus voltage $V_{BUS}$ and is fed back via a first feedback path RZ1 to the power regulating configuration LRA. A bus voltage signal BS2 being available at an output of the first feedback path RZ1. Such regulation is generally also referred to as feed forward control.

The switched-mode power supply also has a second measurement configuration MA2 having a first and a second input terminal, which are connected to the first and the second output terminal AK5, AK6 of the switched-mode regulator (SCH). A regulating signal AS1 that is dependent on the output voltage VOUT is available at the output of the second measurement configuration MA2. The second regulating signal AS1 is fed back via a second feedback path RZ2 to the power regulating configuration LRA, in which case an output signal AS2 is present at one output of the second feedback path RZ2. One embodiment of the switched-mode power supply provides for the first regulating signal BS1 to be applied to one input of the power regulating configuration as well, in addition to the bus voltage signal BS2. This feedback is shown by dashed lines in FIG. 1.

Figure 2:
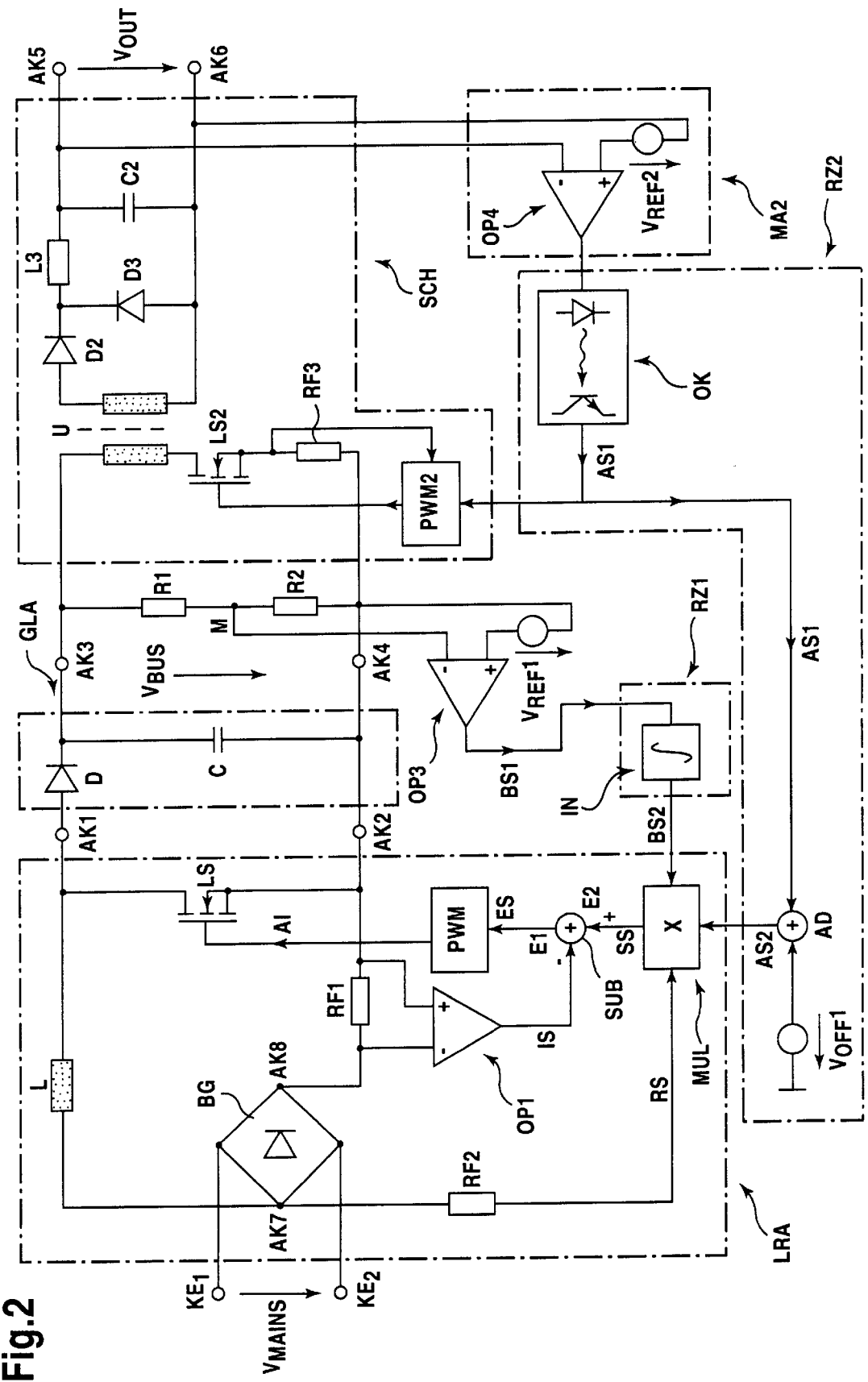
FIG. 2 is a circuit diagram of a first exemplary embodiment of the switched-mode power supply.
Figure 3:
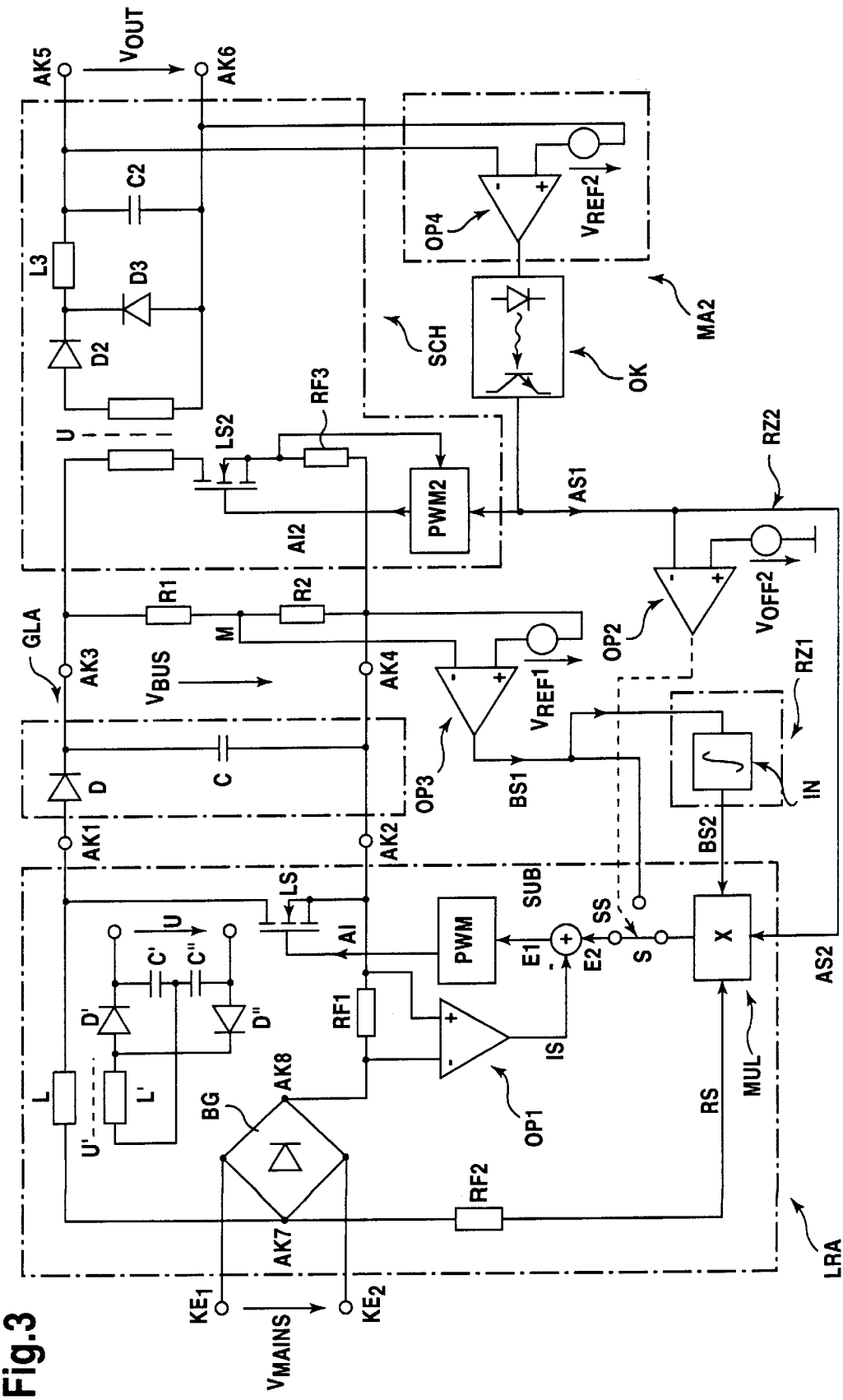
FIG. 3 is a circuit diagram of a second exemplary embodiment of the switched-mode power supply.

FIGS. 2 and 3 show exemplary embodiments of the switched-mode power supply illustrated in the block diagram in FIG. 1, in which case FIGS. 2 and 3 show the configuration of the individual function blocks in detail.

The illustrated power regulating configuration LRA has a bridge rectifier BG which is connected in parallel with the first and second connecting terminals KE1, KE2, with an inductance L being connected in series with the output terminals AK7, AK8 of the bridge rectifier BG. The power regulating configuration LRA also has a power switch LS, which is connected in parallel with the first and second output terminals AK1, AK2 of the power regulating configuration, and which is opened or closed controlled by drive pulses AI.

The drive pulses AI are produced by, a pulse-width modulator PWM, which produces the drive pulses AI using an oscillator lock, with the duration of the drive pulses AI being dependent on an input signal ES applied to an input of the pulse-width modulator PWM. In the present exemplary embodiments, the pulse-width modulator PWM is chosen such that the drive pulses AI become longer the greater the input signal ES, and vice versa. The power switch LS is closed for as long as a drive pulse AI is present.

The input signal ES of the pulse-width modulator PWM is obtained, in both exemplary embodiments, from the difference between a control signal SS and a current signal IS, which is formed by a subtraction configuration SUB to whose first input E1 the current signal IS is applied, and to whose second input E2 the control signal SS is applied. The current signal IS is obtained from the voltage drop across a first current sensing resistor RF1, which is connected in series with the output terminals AK7, AK8 of the bridge rectifier BG. This voltage drop is directly proportional to the current flowing in the power regulating configuration LRA downstream of the bridge rectifier BG. A first operational amplifier OP1 forms the current signal IS from the voltage drop which can be tapped off across the first current sensing resistor RF1.

The control signal SS is obtained, in the exemplary embodiment shown in FIG. 2, from multiplication of a reference signal RS produced in the power regulating configuration LRA by the bus voltage signal BS2 present at the output of the first feedback path RZ1 and by the output signal AS2 present at the output of the second feedback path RZ2. The multiplication is carried out by a multiplier configuration MUL having three inputs, to which the reference signal RS, the second bus voltage signal BS2 and the output signal AS2 are applied.

In the exemplary embodiment illustrated in FIG. 3, the control signal is obtained either from multiplication of the reference signal RS by the bus voltage signal BS2 and the output signal AS2, or from the first bus voltage signal BS1. For this purpose, the power regulating configuration LRA has a changeover switch S, one output terminal of which is connected to the second input E2 of the subtraction configuration SUB, one input terminal of the changeover switch S is connected to an output of the multiplier configuration MUL, and a second input terminal of which is connected to an output of the first measurement configuration MA1.

In the illustrated example, the changeover switch S is switched over as a function of the first output signal AS1. To do this, a difference signal is formed by a second operational amplifier OP2 from the first output signal AS1 and an offset signal supplied from a second offset voltage source $V_{OFF}2$, and is amplified if necessary. The switching is carried out such that, if the second regulating signal AS1 is less than a predetermined limit value, the control signal SS is formed by the first bus voltage signal, while, if the first output signal AS1 is greater than the predetermined limit value, the control signal is formed by the product of the reference signal RS, the output signal AS2 and the bus voltage signal BS2.

In both exemplary embodiments, the reference signal RS is obtained at the output of a second current sensing resistor RF2, one terminal of which is connected to the first output terminal AK7 of the bridge rectifier BG.

In both exemplary embodiments, the rectifier configuration contains a diode D which is connected in series with one input of the rectifier configuration GLA, and a capacitor C which is connected in parallel with the first and second output terminals AK3, AK4 of the rectifier configuration GLA.

The first measurement configuration MA1 has a voltage divider containing a series circuit formed by a first and a second resistor R1, R2, which is connected in parallel with the first and second output terminals AK3, AK4 of the rectifier configuration GLA. The first measurement configuration MA1 has a center tap M that is connected to one input of a third operational amplifier OP3. A first reference voltage source $V_{REF}1$ is connected between the second output terminal AK4 of the rectifier configuration GLA and a second input of the third operational amplifier OP3. The first regulating signal BS1 is present at the output of the third operational amplifier OP3, and is obtained from the difference between the reference voltage $V_{REF}1$ and the voltage which can be tapped off between the center tap M and the second output terminal AK4. The first regulating signal BS1 thus becomes smaller the greater the voltage present between the center tap M and the second output terminal AK4, and the greater the bus voltage $V_{BUS}$.

The first bus voltage signal BS1 is fed back to the multiplication configuration MUL of the power regulating configuration LRA by the second feedback path RZ2 which, in both illustrated exemplary embodiments, has an integrator configuration IN.

The switched-mode regulator SCH is connected to the connecting terminals AK3, AK4 of the rectifier configuration GLA and essentially contains a transformer U, a second power switch LS2 connected in series with a coil on the primary of the transformer U, and a third current sensing resistor RF3 connected in series therewith. A third rectifier configuration containing two diodes D2, D3, an inductance L3 and a capacitor C2 is connected in parallel with a coil on the secondary of the transformer U. The switched-mode regulator SCH furthermore has a second pulse-width modulator PWM2, which produces second drive pulses AI2 for driving the second power switch LS2 as a function of the second regulating signal AS1.

The second measurement configuration MA2 illustrated in FIGS. 2 and 3, has a fourth operational amplifier OP4, a first input terminal of which is connected to the first output terminal AKS of the switched-mode regulator SCH. A second reference voltage source $V_{REF}2$ is connected between a second input terminal of the fourth operational amplifier OP4 and the second output terminal AK6 of the switched-mode regulator SCH. The second regulating signal AS1 is present at one output of the fourth operational amplifier OP4, and is obtained from the difference signal between the second reference voltage $V_{REF}2$ and the output voltage $V_{OUT}$, which is amplified, if necessary, by the fourth operational amplifier OP4. The second regulating signal AS1 thus becomes smaller, the greater the output voltage $V_{OUT}$.

As indicated in FIGS. 2 and 3, it is possible to transmit the second regulating signal AS1 with DC isolation, for example by an optocoupler OK, from the second measurement configuration MA2 to the switched-mode regulator SCH and to the second feedback path RZ2.

The second feedback path RZ2, illustrated in FIG. 2, also has first offset voltage source $V_{OFF}1$ and an adder AD for adding n offset signal to the second regulating signal AS1, in order to prevent the output signal AS2 and thus the control signal SS from becoming zero.

The method of operation of the switched-mode power supply according to the invention will be described in the following text with reference to the exemplary embodiment illustrated in FIG. 2, and assuming a sinusoidal mains voltage $V_{MAINS}$.

When a drive pulse AI is applied to the power switch LS, the switch LS is closed and a current flows via the first output terminal AK7, of the bridge rectifier BG, the inductance L, the power switch LS, the first current sensing resistor RF1 and the second output terminal AK8 of the bridge rectifier BG. The voltage which is present at the output terminals AK1, AK2 of the power regulating configuration is virtually zero when the power switch LS is closed. After the end of a drive pulse AI and after the power switch LS has been opened, a current flows via the inductance L into the rectifier configuration GLA in which the capacitor C is charged via the diode D. The voltage which is present at the output terminals AK1, AK2 of the power regulating configuration LRA is obtained when the power switch LS is open, ignoring the voltage dropped across the first current sensing resistor RF1, from the addition of the voltage present at the output terminals AK7, AK8 and the voltage which is present across the inductance L and depends on the energy which has been stored in the inductance L when the power switch LS was closed.

Since the frequency at which the drive pulses AI are produced is several orders of magnitude greater than the maximum frequency of the voltage which is present at the output terminals AK7, AK8 of the bridge rectifier BG, this voltage can be assumed to be approximately constant for the duration of the drive pulses. It can thus be stated that the energy stored by the inductance L when the power switch LS is closed and which is emitted to the capacitor C when the power switch LS is opened becomes greater the longer the power switch LS is closed, that is to say the longer the drive pulses AI.

The object of the power regulating configuration LRA is, on the one hand, to ensure a mains current consumption which is as sinusoidal as possible, and, on the other hand, to regulate the power emitted to the rectifier configuration GLA such that the bus voltage $V_{BUS}$ us is as constant as possible. On the assumption that the current signal IS changes quickly in comparison with the bus voltage signal BS2 and the output signal AS2, the following text will consider the regulation of the input current for a constant bus voltage signal BS2 and a constant output signal AS2. The control signal SS then represents only a reference signal RS weighted by a constant factor. The input signal ES of the pulse-width modulator PWM is then obtained from the difference between the weighted reference signal RS and the current signal IS. The pulse-width modulator PWM is chosen such that the duration of the drive pulses AI produced by it becomes longer the greater the input signal ES.

If the current signal IS, which reflects the current actually flowing in the power regulating configuration LRA, differs to a major extent from the reference signal RS, which is an ideal full-wave rectified sine function in the present case, the pulse-width modulator PWM produces drive pulses AI with a greater duration, so that the current consumption rises when the power switch LS is closed. Conversely, if the difference between the weighted reference signal RS and the current signal IS is small, the pulse-width modulator PWM produces short drive pulses AI, and the power switch LS remains closed for a shorter time period, so that the current consumption cannot rise so sharply.

While the reference signal RS changes at a frequency of 100 Hz for a mains frequency of 50 Hz, the reference signal weighting resulting from the bus voltage signal BS2 and the output signal AS2 changes very slowly in comparison with this. A reduction in the load on the output terminals AK5, AK6 of the switched-mode regulator SCH results in a rise in the output voltage $V_{OUT}$, which immediately results in a drop in the output signal AS2 and a rise in the bus voltage $V_{BUS}$ which, owing to the integration process, results in a drop in the second bus voltage signal after a time delay. If the bus voltage signal BS2 or the output signal AS2 now drops, then the input signal ES is also reduced, and the pulse-width modulator PWM thus produces shorter drive pulses, the energy stored by the inductance L during the period of the drive pulses is reduced, and the energy emitted to the capacitor C after the end of the drive pulses is thus also reduced.

Thus, when the bus voltage $V_{BUS}$ rises or the output voltage $V_{OUT}$ rises, the power regulating configuration LRA ensures that the power emitted to the rectifier configuration GLA and to the switched-mode regulator SCH is reduced. The advantage of the present invention is faster regulation of the power emitted, since changes in the output voltage $V_{OUT}$ are fed back to the power regulating configuration LRA without any delay.

The switched-mode power supply illustrated in FIG. 3 also has a second inductance L', which complements the inductance of the power regulating configuration LRA to form a second transformer U'. A second rectifier configuration, which contains two diodes D', D2" and two capacitors C', C2" and at whose output a supply voltage V can be tapped off, is connected in parallel with the second inductance L'. Using connections which are not shown in any more detail here, the supply voltage V can be used to supply voltage to the control logic of the power regulating configuration LRA and of the switched-mode regulator SCH. Since, in the switched-mode power supply according to the invention, the power regulating configuration need not be necessarily switched off by overloading, this ensures that voltage is supplied continuously to the control logic.

I claim:

1. A switched-mode power supply, comprising:
    at least one power factor controller having a power regulating configuration for regulating a sinusoidal mains current consumption, said power regulating configuration having output terminals,
        a power switch disposed in parallel with said output terminals of said power regulating configuration and driven by drive pulses,
        a subtraction configuration with an output,
        a first input and a second input, and
        a pulse-width modulator with an input connected to said output of said subtraction configuration and an output connected to said power switch and outputting the drive pulses to said power switch,
        a rectifier configuration connected to said power regulating configuration,
        two input connections at which a mains voltage can be input into said at least one power factor controller, and
        two output terminals at which a bus voltage can be tapped off and being concurrently output terminals of said rectifier configuration,
        said power regulating configuration forming an internally produced current signal that is applied to said first input of said subtraction configuration and a control signal that is applied to said second input of said subtraction configuration;
    a switched-mode regulator connected to said output terminals of said rectifier configuration and having regulator output terminals at which an output voltage can be tapped off;
    a load connected downstream of said switched-mode regulator and disposed between said regulator output terminals;
    a first measurement configuration having an output outputting a first regulating signal dependent on the bus voltage;
    a feed forward control having a first feedback path with an integrator configuration for feeding back the first regulating signal to said power regulating configuration;
    a second feedback path having an output; and
    a second measurement configuration connected to said regulator output terminals and if a power consumption of said load changes, said second measurement configuration produces a second regulating signal which can be input into said power regulating configuration via said second feedback path.

2. The switched-mode power supply according to claim 1, including:
    a first control loop containing said first feedback path; and
    a second control loop containing said second feedback path, said second control loop compensating for a signal change much more quickly than said first control loop.

3. The switched-mode power supply according to claim 1, wherein:
    said first feedback has an output outputting a bus voltage signal;
    said output of said second feedback path outputting an output signal; and
    said power regulating configuration has a multiplier configuration with an output and three inputs receiving an internally produced reference signal, the output signal from said second feedback path, and the bus voltage signal output by said first feedback path.

4. The switched-mode power supply according to claim 3, wherein said output of said multiplier configuration is connected to said second input of said subtraction configuration.

5. The switched-mode power supply according to claim 3, wherein said power regulating configuration has a controlled changeover switch having an output terminal connected to said second input of said subtraction configuration, a first input terminal connected to said output of said multiplier configuration, and a second input terminal connected to said output of said first measurement configuration.

6. The switched-mode power supply according to claim 5, wherein said changeover switch is controlled as a function of one of the second regulating signal and the output signal of said second feedback path.

7. The switched-mode power supply according to claim 1, wherein said second feedback path has a device for adding an offset signal to the second regulating signal.

8. The switched-mode power supply according to claim 3, wherein said switched-mode regulator has a control circuit, and said pulse-width modulator, said multiplier configuration, said subtraction configuration, said control circuit of said switched-mode regulator, and said second feedback path are integrated monolithically in a semiconductor circuit.

9. The switched-mode power supply according to claim 1, wherein said power regulating configuration has a bridge rectifier with two bridge output terminals and said bridge rectifier connected in parallel with said two input connections of said at least one power factor controller, said power regulating configuration further having an inductance connected in series with said bridge output terminals of said bridge rectifier.

10. The switched-mode power supply according to claim 1, wherein said rectifier configuration has an input, a diode connected in series with said input, and a capacitor connected in parallel with said output terminals of said rectifier configuration.

11. The switched-mode power supply according to claim 3, wherein said power regulating configuration has a current sensing resistor with terminals and across said terminals a voltage which is proportional to the internally produced current signal can be tapped off.

12. The switched-mode power supply according to claim 11, wherein said power regulating configuration has a further current sensing resistor providing the internally produced reference signal.

13. The switched-mode power supply according to claim 1, wherein said first measurement configuration has a voltage divider connected in parallel with said output terminals of said rectifier configuration.

14. The switched-mode power supply according to claim 9, wherein said power regulator configuration has a further inductance complementing said inductance to form a transformer, and a further rectifier configuration connected downstream of said further inductance.

* * * * *